United States Patent Office 3,796,706
Patented Mar. 12, 1974

3,796,706
1,3-DIARYL PYRAZOLE OPTICAL BRIGHTENERS
Heinrich Häusermann, Riehen, and Eduard Troxler, Basel, Switzerland, assignors to Ciba-Geigy Corporation, Ardsley, N.Y.
No Drawing. Continuation-in-part of abandoned application Ser. No. 703,865, Feb. 8, 1968. This application Aug. 20, 1970, Ser. No. 65,699
Int. Cl. C07b 49/18
U.S. Cl. 260—240.1                    2 Claims

ABSTRACT OF THE DISCLOSURE

Fluorescent 1,3 - diaryl-pyrazole compounds are described as optical brighteners, especially for application to cellulose and polyamide fiber materials.

CROSS REFERENCE

This is a continuation-in-part of the copending application Ser. No. 703,865, filed Feb. 8, 1968, now abandoned.

DESCRIPTION OF THE INVENTION

The present invention concerns new fluorescent 1,3-diaryl pyrazole compounds which are valuable as optical brighteners for detergents, paper, textiles and plastics, and processes for the production thereof.

1,3-diphenyl pyrazolines which contain simple ring substituents such as halogen, low alkyl, alkylsulphonyl, carboxyl, carbalkoxy or sulphonic acid amide groups are distinguished by very vivid fluorescence and therefore, in spite of certain disadvantages, have become of great industrial importance as optical brighteners.

Indeed, these simply substituted pyrazolines suffer from certain drawbacks, especially a relatively slight affinity for cellulose fibres, poor fastness to light and limited stability to oxidative influences; this latter disadvantage is due to a deterioration of the 1,3-diphenyl pyrazolines which involves formation of the corresponding pyrazole compounds, apart from other phenomena. A very considerable loss of fluorescence intensity is connected with this deterioration. In fact, the 1,3 - diphenyl pyrazole compounds corresponding to the aforesaid optical brighteners of the pyrazoline series have absolutely no industrial importance as optical brighteners.

Attempts made by us to produce satisfactory optical brighteners of the 1,3 - diphenyl-pyrazolinyl-4-stilbene class failed, because the products obtained by us were of yellowish intrinsic color which rendered them completely useless as optical brighteners.

In spite of the above described discouraging performance of structurally closely related compounds, we have now found that pyrazole derivatives in which the 1-position of the pyrazole nucleus is occupied by a stilbyl group and the 3-position is occupied by an aromatic carbocyclic or heterocyclic radical linked by a carbon atom thereof to the pyrazole nucleus, have unexpectedly outstanding properties rendering them useful for the optical brightening of cellulose and polyamide fibers.

The invention, therefore, provides novel 3-aryl-1-stilbyl-pyrazoles of the formula

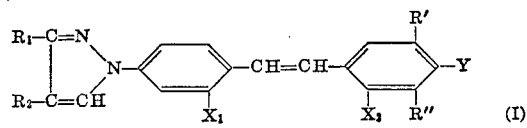

wherein $R_1$ is an unsubstituted phenyl radical, a phenyl radical substituted by alkyl having 1 to 4 carbon atoms, alkoxy having 1 to 4 carbon atoms, the group —O—CH$_2$—O—, or/and halogen; thienyl or furyl, $R_2$ is hydrogen or alkyl having 1 to 4 carbon atoms, or
$R_1$ and $R_2$ form together with the two carbon atoms of the pyrazolyl ring to which they are attached a carbocyclic ring of 6 members, $X_1$ and $X_2$ represent independently halogen, hydroxyalkylsulfonyl having 1 to 4 carbon atoms, carboxyalkylsulfonyl having 1 to 4 carbon atoms, sulfoxyalkylsulfonyl having 1 to 4 carbon atoms, alkoxy having 1 to 4 carbon atoms, and one of $X_1$ and $X_2$ represents hydrogen, SO$_3$H, —CN or unsubstituted amide, Y represents hydrogen, halogen, alkoxy having 1 to 4 carbon atoms, alkyl having 1 to 4 carbon atoms, phenyl, the group

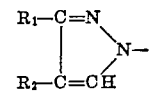

wherein $R_1$ and $R_2$ have the meaning given above, or the group

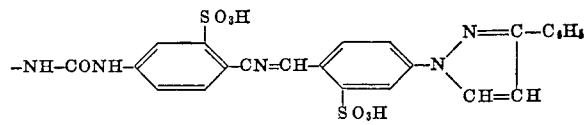

or the group C$_6$H$_5$—CONH—, unsubstituted or substituted by alkoxy having 1 to 4 carbon atoms, or the group

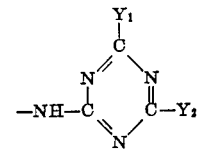

wherein $Y_1$ and $Y_2$ represent independently halogen, alkyl having 1 to 4 carbon atoms, alkoxy having 1 to 4 carbon atoms, alkylthio having 1 to 4 carbon atoms, morpholino, dimethyl morpholino, the unsubstituted amino group or an amino group which is substituted by phenyl which can be substituted by —COOH, halogen, alkyl having 1 to 4 carbon atoms, alkoxy having 1 to 4 carbon atoms, sulfonamide and —SO$_3$H; an amino group substituted by one or two alkyl groups having each 1 to 4 carbon atoms, which can be substituted by —COOH, SO$_3$H, hydroxy, alkoxy having 2 to 4 carbon atoms, hydroxyalkoxy having 2 to 4 carbon atoms and phenyl; or an amino group substituted by cyclohexyl, R' represents hydrogen, halogen, alkyl having 1 to 4 carbon atoms or alkoxy having 1 to 4 carbon atoms, and R'' represents hydrogen or alkoxy having 1 to 4 carbon atoms, and Formula II

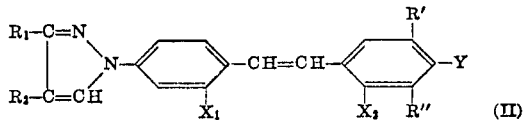

wherein $R_1$ is an unsubstituted phenyl radical, a phenyl radical substituted by alkyl having 1 to 4 carbon atoms, alkoxy having 1 to 4 carbon atoms, the group —O—CH$_2$—O—, or/and halogen; thienyl or furyl, $R_2$ is hydrogen or alkyl having 1 to 4 carbon atoms, or
$R_1$ and $R_2$ form together with the two carbon atoms of the pyrazolyl ring to which they are attached a carbocyclic ring of 6 members, X₁ and X₂ represent independently hydrogen, —SO₃H, —CN, halogen, alkylsulfonyl having 1 to 4 carbon atoms, hydroxyalkylsulfonyl having 1 to 4 carbon atoms, carboxyalkylsulfonyl having 1 to 4 carbon atoms, sulfoxyalkylsulfonyl having 1 to 4 carbon atoms, alkoxy having 1 to 4 carbon atoms, the unsubstituted sulfon amide group, a sulfon amide group substituted by alkyl having 1 to 18 carbon atoms, hydroxyalkyl having 2 to 4 carbon atoms and aminoalkyl having 2 to 6 carbon atoms; a sulfomorpholide, sulfopiperazide, sulfopiperidide or sulfopyrrolidide group, whereby the latter group can be substituted by alkyl having 1 to 4 carbon atoms and hydroxyalkyl having 1 to 4 carbon atoms, Y represents halogen, alkoxy having 1 to 4 carbon atoms, alkyl having 1 to 4 carbon atoms, phenyl, the group

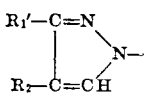

wherein

R₂ has the meaning given above,
R₁' represents thienyl, or furyl, or
R₁' and R₂ form together with the two carbon atoms of the pyrazolyl ring to which they are attached a carbocyclic ring of 6 members, or the group

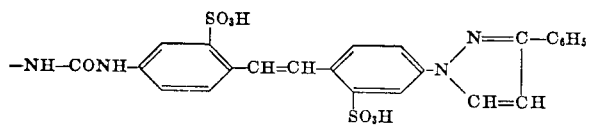

or the group C₆H₅—CONH— unsubstituted or substituted by alkoxy having 1 to 4 carbon atoms, or the group

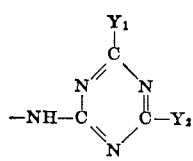

wherein

Y₁ and Y₂ represent independently halogen, alkyl having 1 to 4 carbon atoms, alkoxy having 1 to 4 carbon atoms, alkylthio having 1 to 4 carbon atoms, morpholino, dimethylmorpholino, the unsubstituted amino group or an amino group which is substituted by phenyl which can be substituted by —COOH, halogen, alkyl having 1 to 4 carbon atoms, alkoxy having 1 to 4 carbon atoms, sulfon amide and —SO₃H; an amino group substituted by one or two alkyl groups having each 1 to 4 carbon atoms, which can be substituted by —COOH, —SO₃H, hydroxy, alkoxy having 2 to 4 carbon atoms, hydroxyalkoxy having 2 to 4 carbon atoms, and phenyl; or an amino group substituted by cyclohexyl, R' represents hydrogen, halogen, alkyl having 1 to 4 carbon atoms or alkoxy having 1 to 4 carbon atoms, and
R'' represents hydrogen or alkoxy having 1 to 4 carbon atoms.

Preferred are compounds of the Formula Ia (a) 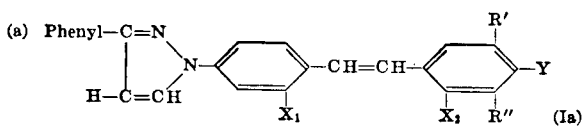

wherein

X₁ and X₂ represent independently F, Cl, hydroxyethylsulfonyl, carboxyethylsulfonyl, sulfoxyethylsulfonyl, methoxy, or one of X₁ or X₂ represents —CN or HSO₃—, Y represents hydrogen, halogen, methoxy, methyl, phenyl, the group

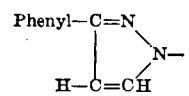

R' represents hydrogen, chloro, methyl or methoxy, and
R'' represents hydrogen or methoxy and the Formula IIa (b) 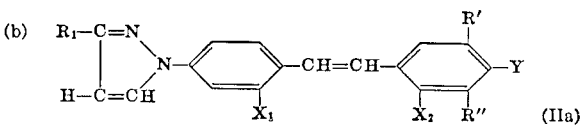

wherein

R₁ is an unsubstituted phenyl radical, a phenyl radical substituted by methyl, methoxy, the group

and/or halogen; thienyl or furyl,
R₁ and R₂ are together the group

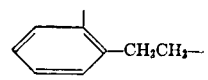

X₁ and X₂ represents independently hydrogen, —SO₃H, —CN, Cl, Br, methylsulfonyl, methoxy,
Y represents hydrogen, Cl, Br, methoxy, methyl, the group

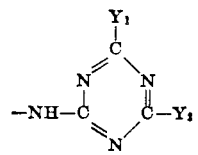

wherein

Y₁ and Y₂ represent independently Cl, alkoxy having 1 to 3 carbon atoms, methylthio, ethylthio, morpholino, dimethylmorpholino, the unsubstituted amino group or an amino group which is substituted by phenyl which can be substituted by —COOH, Cl, methyl, methoxy, sulfon amide and —SO₃H, or an amino group substituted by one or two alkyl groups having each 1 to 4 carbon atoms, which can be substituted by —COOH, —SO₃H, hydroxy, alkoxy having 1 to 2 carbon atoms, hydroxyethyl and phenyl;

R' represents hydrogen, Cl, Br, methyl or methoxy, and
R'' represents hydrogen or methoxy.

The new intensively fluorescent 1,3-diaryl pyrazoles have also remarkable stability to oxidation and are often distinguished by very good affinity to textile fibres. In this last property, they are superior to previously known compounds of similar structure which contain a correspondingly substituted phenyl radical only in the 1-position of the pyrazole ring.

In the compounds of Formula I or II and also in the starting materials used for their production, the rings, particularly the free or condensed aromatic carbocycles, can be unsubstituted or mono- or poly-substituted by identical or different substituents which are non-chromophoric and usual in such structures, this apart from—or in addition to—characteristic bonds.

As ring substituents can be used: normal or branched chain alkyl groups, such as the methyl, isopropyl, n- or tert. butyl or iso-octyl group; halogen up to the atomic number 35, preferably chlorine; cyanogen; ether groups such as alkoxy, benzyloxy groups or optionally substituted phenoxy groups; carboxyl and sulphonic acid groups as well as functional derivatives thereof such as ester and amide groups, particularly carbalkoxy, aryloxysulphonyl and sulphonic acid amide groups, which latter are derived from ammonia, aliphatic or cycloaliphatic primary or secondary amines, also particularly from hydroxy, alkoxy and tert. aminoalkyl amines, from primary and secondary araliphatic amines, from aromatic amines and from mixed aliphatic-aromatic amines; alkyl, sulphonated alkyl, hydroxyalkyl, sulphated hydroxyalkyl and aryl sulphonyl groups; acylamide groups such as, particularly, aroylamide groups, e.g. benzoylamide, alkoxybenzoylamide, phenylureide, alkanoylamide groups such as acetylamide, chloracetylamide, phenylacetylamide, phenoxyacetylamide and phenylpropionylamide groups, alkoxyalkanoylamide and carbalkoxyamide groups, also derivatives of cyclic imide chlorides of carbonic acid such as diazinyl and, particularly, triazinyl, amino groups, including the s-triazinylamino groups usual in optical brighteners of the stilbene series having chlorine, primary, secondary or tertiary amino groups, alkylthio- or alkoxy groups as further substituents of the s-triazine ring. Starting materials can also be used in the production of 1,3-diaryl pyrazoles according to the invention, however, which contain undesirable substituents in the end product when these can be eliminated or modified in the desired way in any step of the production process. Examples are the chromophoric nitro and aryl azo groups which are reduced to amino groups, then acylated or reacted with reactive cyclic imide chlorides of carbonic acid.

In the above and in the following, such non-chromophoric substitutents are only mentioned when attention is drawn to particular conditions for their exclusion, or when there are preferred positions and preferred choice; otherwise they should be understood in general when the ring system is mentioned without further details.

Unsulphonated pyrazole compounds of Formula I or II according to the invention are suitable in the usual amounts of about 0.001 to 1.0% of the polymer, for the improvement of the appearance of yellowed polymeric plastics; soluble salts of monosulphonic acids can be used in usual amounts for the optical brightening of synthetic polyamide and polyurethane fibres in an acid aqueous bath; compounds containing sulphamide groups can be used for the optical brightening of the same types of fibre in washing liquors. Detergents according to the invention contain about 0.005 to 0.5% of the new pyrazole compounds calculated on the total weight of the compositions.

In general, the compounds according to the invention are used in concentrations of 0.0005 to 0.1% calculated on the weight of the textile goods to be whitened, and are added to the wash liquors in amounts of from 0.001 to 0.05 gram, preferably about 0.003 to 0.01 gram per liter, depending upon the number of washing operations to be performed with one and the same liquor and the goods-to-liquor weight ratio to be applied. The latter ranges from about 1:50 to 1:3 preferably 1:30 to 1:20 in the case of manual laundering and 1:8 to 1:3 when using washing machines.

A wash liquor as conventionally applied for the washing of cotton or nylon material contains about 2 to 5 grams of wash powder per liter which determines the concentration of the compounds of the invention.

Textile materials of cellulosic or synthetic polyamide fibers washed with the aforesaid wash liquors possess an attractive, brilliant white appearance of "neutral white" or with a desirable faint violet-bluish or reddish-violet hue, even when the brighteners are applied in such high dosages as 160 to 240 mg. per liter of brightening and washing liquors, while known brighteners often show undesirable greenish hues in these concentrations. In the last-stated range of concentrations, fluorescence of fabrics brightened with a compound according to the invention increases with increasing amount thereof and no "greening" occurs.

Since some of the products have good stability to acids and are readily water-soluble, highly concentrated liquid preparations can be produced which can be used in the manufacture of paper or the finishing of cotton.

Some of the compounds according to the invention may also be combined with textile softeners to produce beautiful optical brightening effects.

White maxima are generally attained with smaller amounts of the brighteners according to the invention than are required of similar known brighteners.

Repeated laundering (10 to 20 times and more) with wash liquors having relatively high concentrations of a brightening compound according to the invention further improves this pleasant appearance, without producing an undesirable residual hue, e.g. of yellow or green.

Increasing whiteness after repeated washings is also referred to as "build-up" and is particularly strong in the case of the compounds according to the invention.

Textile materials of cellulosic fibers, especially cotton, are laundered with the wash liquors containing a brightener compound according to the invention under conventional conditions, e.g. at temperatures of 30° to 80° C.

The white aspect of the fabrics brightened with a compound according to the invention is fast to light, and to hypochlorite type bleaching agents.

The stability of compounds according to the invention is also shown by the fact that some of them can be recrystallized from a hot aqueous sodium hypochlorite solution.

Detergents usable in the wash liquors are ionogenic agents such as soaps, water-soluble salts of higher fatty alcohol sulfates, higher alkyl and/or polyalkyl-substituted aryl sulfonic acids, esters of medium to higher alkanols and sulfocarboxylic acids; higher alkanoylamino-arylcarboxylic or -sulfonic acids, or fatty acid glycerin sulfonates; also unsable are non-ionogenic detergents such as higher alkylphenol-polyglycol ethers.

Furthermore, the above-described wash liquors may also contain conventional adjuvants such as alkali metal polyphosphates or -polymetaphosphates, alkali metal silicates, alkali metal borates, especially perborates, alkali metal salts of carboxy-methyl cellulose, foam stabilizers such as alkanol amides of higher fatty acids, or complex-formers such as water-soluble salts of ethylene diamino-tetracetic acid.

It is also possible to dye the colored pyrazolines of Formula I or II, infra, onto textile fibers and then subject the dyed goods to an oxidizing bleach so that they are simultaneously chemically bleaching and optically brightening. Among other things, this process is suitable for comparisons of strength because the color strength of the dyeing can be made to sample. A reductive aftertreatment of the whitening oxidatively attained on the fiber is often of advantage.

A method for the production of pyrazole compounds according to the invention consists in condensing a suitable substituted aryl hydrazine of the General Formula II

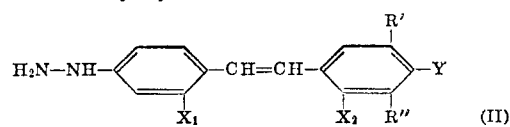

or a derivative of such a compound which reacts in the same way under the reaction conditions, (a) With a 1,3-dicarbonyl compound of the General Formula IIIa

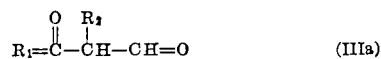

but—because of the formation of undesirable isomers—better (b) With a reactive derivative of the corresponding enol of Formula IIIb

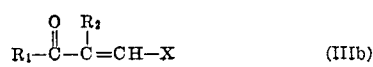

wherein X represents an esterified or etherified hydroxyl group, particularly also, chlorine or bromine; or (c) With a reactive derivative of a hydrating product of such a 1,3-diketone of Formula IIIc

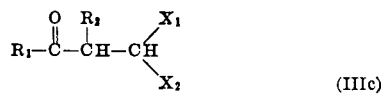
(IIIc)

wherein $X_1$ and $X_2$ represent, e.g., an esterified or etherified hydroxyl group which can also be cyclically bound, optionally, also halogen or a group formed under the influence of agents which accelerate the keto condensation, e.g. the radical of a secondary aliphatic, optionally cyclic, imino group or a thiol or alkylthio group; or (d) With an aroylalkinyl compound of Formula IIId

(IIId)

by methods known per se and under expertly adapted conditions with regard to the properties of the components, particularly the solubility properties, to form a pyrazole compound of Formula I.

Starting materials of Formula II are obtained by known methods, e.g. from the diazonium compound by reduction of the diazonium group to the hydrazino group. Examples are: 4-hydrazino-stilbene, particularly those which contain at least in one of the benzene rings in o-position to the vinylene bridge, a negative substituent such as cyanogen, carbalkoxy or sulphonyl substituents, particuarly also 4,4'-bis-[hydrazino]-stilbene-2,2'-disulphonic acid and 4'-nitro-4'-hydrazino-stilbene-2,2'-disulphonic acid and 4'-acyl- and 4'-triazinyl-amino-4-hydrazino-stilbene-2,2'-disulphonic acids, 4'-benztriazolyl- and naphthotriazolyl-4-hydrazino-stilbene-2,2'-disulphonic acids, 4,4'-bis-[hydrazino]-2-chloro-stilbene - 2' - sulfonic acid, 4,4'-bis-[hydrazino]-2,2'-bis-[2 - carboxyethylsulfonyl] - stilbene, 4,4' - bis - [hydrazino] - 2,2' - bis - [2 - sulfoalkylsulfonyl]-stilbene, 4,4' - bis-[hydrazino]-2-methoxy-stilbene-2'-sulfonic acid.

Derivatives of hydrazine compounds of Formula II which can react like these under suitable reaction conditions, which can also be used according to the invention are, e.g. the hydrazine-N-sulphonic acids formed by reduction of corresponding diazonium compounds with sulphurous acid and salts thereof, which hydrazine-N-sulphonic acids split off the sulphonic acid group on condensation in an acid medium, also corresponding acyl hydrazides of low fatty acids and aryl hydrazones of low ketones produce for stabilization against oxidative influences in the atmosphere; these can react on removal of the protecting group.

As starting materials of the Formula IIIa to d, chiefly the benzoylacetaldehyde acetals embraced by Formula IIIc and the β-chlorovinyl aryl ketones embraced by Formula IIIb are used, which latter can be produced according to Darzens from aroyl halides and alkines or vinyl halides in the presence of Lewis acids.

Because of the easy accessibility of the 1,3-diaryl pyrazolines producible in good yields by several methods from cheap starting materials, the dehydrogenation of such suitably substituted compounds to corresponding pyrazoles is of disproportionately great importance.

Thus, the preferred process for the production of end products according to the invention consists in reacting such a pyrazoline compound of Formula V

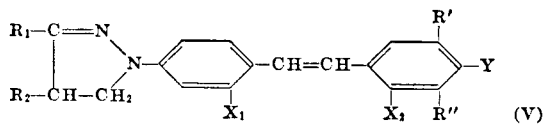
(V)

with hydrogen acceptors, particularly with suitable oxidizing agents while removing hydrogen from the 4,5-position of the pyrazoline ring, to form a pyrazole compound.

As hydrogen acceptors, in this process the most varied active substances known per se can be used, for example chloranil in inert organic solution of the pyrazolines, e.g. when heating the pyrazolines in aromatic hydrocarbons such as xylene with chloranil; sulphur, e.g. when heating the pyrazolines in the sulphur melt or in inert organic solution; salts of oxidizing acids, e.g. soluble alkali or alkaline earth metal salts of hypochlorous or hypobromous acid; oxygen in aqueous solution of the pyrazolines in the presence of heavy metal oxidation catalysts such as manganese salts, cuprisetramine salts; metal compounds of higher stages of oxidation such as lead dioxide, lead tetraacetate; potassium ferricyanide; per compounds such as hydrogen peroxide, persulphates, percarbonates and perborates for water soluble pyrazolines. The suitable amounts of dehydrogenating agent and completion of the dehydrogenation can be recognized very easily by loss of the self-color of the pyrazolines.

The following non-limitative examples illustrate the invention. The temperatures are given therein in degrees centigrade.

EXAMPLE 1

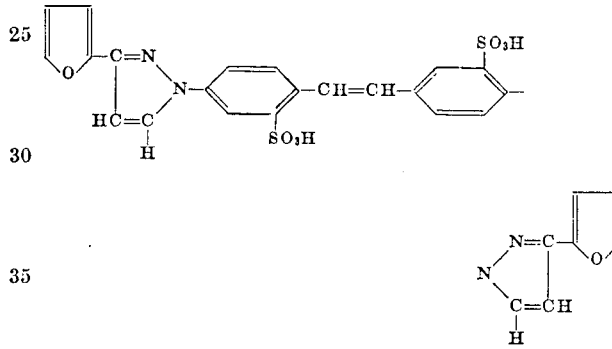

40 g. of 4,4'-dihydrazinostilbene-2,2'-disulphonic acid (German Pat. No. 46,321) and 8 g. of sodium hydroxide are dissolved in 700 ml. of water at 65°. At 30°, the solution of 32 g. of 2-furyl-2-chlorovinyl ketone [Chemical Abstracts, 54, p. 22,606 (1960)] in 50 ml. of ethylene glycol monomethyl ether are added to this solution while stirring. The mixture is stirred, first for 4 hours at 30° and then for 3 hours at 55–60° and the hydrochloric acid liberated is gradually buffered with an aqueous solution of 9 g. of sodium carbonate. To complete the reaction, the mixture is stirred under reflux for 2 hours. It is then cooled. The precipitated product is then separated and purified by recrystallization from water/pyridine with the addition of sodium hypochlorite.

In this way, the disodium salt of 4,4'-bis-[3-furyl-(2)-pyrazolyl-(1)]-stilbene-2,2'-disulphonic acid is obtained as yellowish crystals. The diluted aqueous solution of the new pyrazole derivative fluoresces blue-violet in daylight.

The product has good affinity to cellulose fibres and good stability to chemical bleachers such as alkali hypochlorites and perborates. The new compound can be used for the optical brightening of cellulose substrata such as cotton, rayon silk, staple fibres, paper and cellulose pulp. Also polyamide substrata are optically brightened from an acid bath. The textiles brightened with the new pyrazole derivative have relatively good fastness to light. The new optical brightener is also effective in detergents. Cellulose textiles washed with such detergents containing the optical brightener are simultaneously cleansed and optical brightened. Because of the good stability of the new optical brightener to chemical bleachers which give off chlorine, the product can also be incorporated into such detergent compositions which contain, e.g., alkali or alkaline earth metal salts of dichloroisocyanuric acid such as are described, e.g. in U.S. Pat. Nos. 3,072,054 and 3,150,132.

The product can also be incorporated into polyamide spinning masses. In this way, brilliant, white polyamide threads are obtained which have been brightened in the mass.

If with otherwise the same procedure, the 2-furyl-2-chlorovinyl ketone in this example is replaced by 35 g. of (2 - thienyl)-(2-chlorovinyl)ketone [Chemical Abstracts, 54, p. 22,606 (1960)] 4,4'-bis-[3-thienyl-(2)-pyrazolyl-(1)]-stilbene-2,2'-disulphonic acid is obtained.

This compound too is a valuable optical brightener for cellulose and polyamide substrata.

If with otherwise the same procedure the 40 g. of 4,4'-dihydrazino-stilbene-2,2'-disulphonic acid in this example are replaced by 35 g. 4,4'-dihydrazino-2-methoxystilbene-2'-disulphonic acid [which is produced from the corresponding diamine (U.S. Pat. No. 2,762,802) by diazotizing and reduction with $Na_2SO_3$ and subsequent hydrolysis with hydrogenchloride solution] and the 32 g. of 2-furyl-2-chlorovinyl ketone are replaced by 34 g. of phenyl-2-chlorovinyl ketone [Chemical Abstracts, 51, p. 15,449 (1957)], 4,4' - bis - [3 - phenyl - pyrazolyl-(1)]-stilbene-2-methoxy-2'-disulphonic acid is obtained.

The free acid of the formulas given in Example 1 are produced by dissolving its sodium salt, obtained as described in Example 1, in water of 90° C. and adding thereto 10 times the equivalent amount of concentrated hydrochloric acid. The free acid of the aforesaid formulas then precipitates as yellow flakes which is separated from the mother liquor by filtration and well washed with 5% hydrochloric acid.

In an analogous manner the sodium sulfonates produced by all other examples according to the invention can be converted to the free acids.

From the free acids, other salts such as the potassium salt or ammonium salts can be produced by neutralization with the respective hydroxide.

EXAMPLE 2

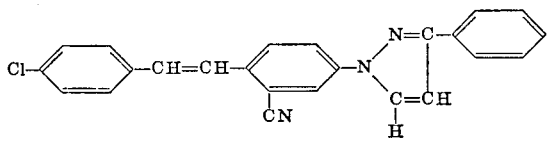

3.75 g. of 1-[2-cyano-4'-chlorstilbenyl-(4)]-3-phenyl-pyrazoline in 100 ml. of xylene are refluxed for 24 hours with 3.0 g. or chloranile while stirring. The yellow reaction solution is then quickly boiled up with 5 g. of basic aluminum oxide, then filtered hot and the filtrate is cooled to 10°. The new pyrazole derivative of the above formula crystallizes out in the form of pale yellowish crystals. On recrystallizing from xylene with the addition of decoloring carbon, the product is obtained in almost colorless crystals which melt at 152°.

The new pyrazoyly-stilbene derivative fluoresces violet in organic solution. In the usual amounts, the compound brightens the polyamide or polyester fibres.

The 1 - [2-cyano-4'-chlorstilbenyl-(4)]-3-phenyl-pyrazoline mentioned above is produced by diazotizing 25.5 g. of 4-amino-4'-chloro-2-cyanostilbene in a mixture of 66 ml. of 37% hydrochloric acid and 500 ml. of water with 6.1 g. of sodium nitrite at 8–12°, reducing the yellow slurry of the diazonium salt formed with a solution of 70 g. of stannous chloride dihydrate in 40 ml. of 37% hydrochloric acid, and adding 50 ml. of 37% hydrochloric acid. After keeping for 1 hour at 25°, the mixture is heated for 1 hour at 80° to facilitate filtration, the tin-containing hydrazine salt is filtered off under suction at room temperature and slurried in 600 ml. of water. 60 ml. of 30% aqueous sodium hydroxide solution are added, the whole is stirred for 30 minutes at 65°, the 4-hydrazino-4'-chloro-2-cyanostilbene is filtered off under suction while warm and it is purified by recrystallization from alcohol.

13.5 g. of 2-cyano-4-hydrazino-4'-chlorostilbene, M.P. 173°, are stirred for 16 hours at 90–95° in 150 ml. of ethylene glycol monomethyl ether, with 8.5 g. of ω-chloro-propiophenone and 10 ml. of pyridine. The yellow 1-[2-cyano-4'-chlorostilbenyl-(4)]-3-phenyl-pyrazoline which crystallizes out is filtered off under suction and washed with ethylene glycol monomethyl ether and ethanol. After recrystallizing once from chlorobenzene, the pyrazoline melts at 223–224° and has blue-green fluorescence in organic solution.

The compounds of the formula

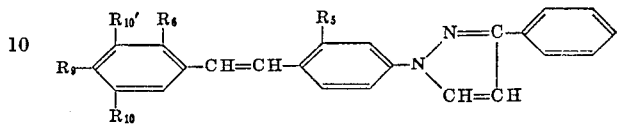

in which $R_5$, $R_6$, $R_9$, $R_{10}$ and $R_{10}'$ have the meanings given in the respective columns of the following table, are obtained by replacing the 25.5 g. of the 4-amino-4'-chloro-2-cyanostilbene by an equivalent amount of the correspondingly substituted stilbene derivatives.

TABLE II

| $R_5$ | $R_6$ | $R_9$ | $R_{10}$ | $R_{10}'$ |
|---|---|---|---|---|
| CN | H | Cl | Cl | H |
| $CH_3-SO_2-$ | H | $CH_3O$ | H | H |
| CN | H | Br | H | H |
| CN | Cl | Cl | H | H |
| Cl | Cl | $CH_3$ | $CH_3$ | H |
| Cl | $CH_3O$ | H | $CH_3O$ | H |
| Cl | H | Cl | Cl | H |
| Br | H | Br | H | H |
| Cl | $CH_3SO_2-$ | Cl | H | H |
| CN | Cl | 3-phenyl-pyrazolyl. | H | H |
| F | $CH_3SO_2-$ | Cl | H | H |
| $CH_3SO_2-$ | H | $CH_3O$ | $CH_3O$ | $CH_3O$ |
| CN | H | Br | Br | H |
| Cl | CN | 3-phenyl-pyrazolyl. | H | H |
| OH ⎮ $CH_2CH_2SO_2-$ | OH ⎮ $CH_2CH_2SO_2-$ | ......do...... | H | H |
| COOH ⎮ $CH_2CH_2SO_2-$ | COOH ⎮ $CH_2CH_2SO_2-$ | ......do...... | H | H |
| $SO_3H$ ⎮ $CH_2CH_2SO_2-$ | $SO_3H$ ⎮ $CH_2CH_2SO_2-$ | ......do...... | H | H |
| CN | H | Phenyl | H | H |

EXAMPLE 3

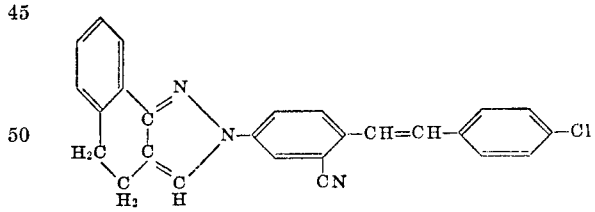

13.5 g. of the 2-cyano-4-hydrazino-4'-chlorostilbene described in Example 2 are heated at 65–70° in a mixture of 200 ml. of butanol, 75 ml. of water and 7.5 g. of sodium carbonate. At this temperature, an aqueous solution of 12.5 g. of 2-dimethylaminomethyl-1-tetralone hydrochloride is added within 15 minutes and the mixture is refluxed for 18 hours while stirring. After cooling, the pyrazoline derivative of the formula

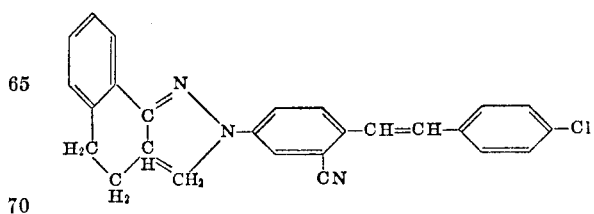

is filtered off and washed with ethanol.

The yellow pyrazoline, which fluoresces blue-green in organic solution, is dehydrogenated by the method described in Example 2 in xylene solution with chloranil to form the pyrazole of the formula first given above and it is purified by recrystallization from ethylene glycol monomethyl ether. The new pyrazole derivative melts at 190°, has a violet fluorescence in organic solution and can be used for the brightening of polyamide and polyester fibres.

EXAMPLE 4

41.5 g. of 4-hydrazino-4'-nitrostilbene-2,2'-disulphonic acid, in the form of the disodium salt, are dissolved in 800 ml. of water and, at 35–40° while stirring, a solution of 24.2 g. of 3,3-dimethoxypropiophenone in 50 ml. of ethylene glycol monomethyl ether is added. After the addition of 20 ml. of 10% acetic acid, the mixture is stirred first for 2 hours at 20–25°, then for 4 hours at 60–70° and, after the addition of 10 ml. of 2 N hydrochloric acid, it is heated for another 10 hours at 60–70° and for 2 hours at 90–100°. After adding 40 g. of sodium chloride, it is allowed to cool, the 4-[3-phenyl-pyrazolyl-(1)] - 4' - nitrostilbene - 2,2' - disulphonic acid sodium salt formed is filtered off and is purified by dissolving and recrystallizing from water with the addition of a slight amount of sodium carbonate and sodium hypochlorite.

15 g. of cast iron powder are suspended in 500 ml. of water and, after the addition of 2 ml. of 80% acetic acid, the whole is heated for 30 minutes at 80–90°. 28.6 g. of the disodium salt of 4-[3-phenyl-pyrazolyl-(1)]-4'-nitrostilbene - 2,2'-disulphonic acid described above are added within 30 minutes to the suspension so prepared at 90–100° and the mixture is stirred under reflux until a sample which has been made alkaline has only a pale yellow color when dropped onto filter paper and the mixture does not become lighter on stirring any longer. The pH of the reduction mixture is then adjusted to 9–10 with aqueous sodium carbonate solution and the iron slurry is filtered off. In this way, a yellowish solution of the disodium salt of 4-amino-4'-[3-phenyl-pyrazolyl-(1)]-stilbene-2,2'-disulphonic acid is obtained which has greenish blue fluorescence in UV light. Without being isolated, the product is converted into s-triazinyl derivatives which can be used as optical brighteners as described below. The amine content of the solution is determined in the usual way by titration with $NaO_2$. 9.25 g. of cyanuric chloride are dissolved in 100 ml. of acetone at room temperature and, while stirring, poured into a mixture of 200 g. of ice and 50 ml. of water. An aqueous solution of the disodium salt of 25 g. of 4-amino-4'-[3-phenyl-pyrazolyl-(1)]-stilbene-2,2'-disulphonic acid is added dropwise while stirring to this cyanuric chloride suspension, care being taken by adding ice that the temperature remains below 0°. After the addition of amine, the pH is adjusted to 3–4 with aqueous sodium carbonate solution and this pH is maintained until no more diazotizable amine can be traced. When this is the case, 4.6 g. of aniline are added, the temperature is gradually raised to 25° and the hydrochloric acid liberated is neutralized with 15% sodium carbonate solution. The mixture is then stirred at 20–30° and pH 6–7 until all the aniline has disappeared. 11.0 g. of morpholine are then added, the mixture is heated for 2 hours at 90–95° and the disodium salt of 4 - [3 - phenyl-pyrazolyl-(1)]-4'-[4-phenylamino-6-morpholino-s-triazinyl - (2)-amino]-stilbene-2,2'-disulphonic acid is salted out by the addition of sodium chloride. After drying, the new optical brightener forms a yellowish, water soluble powder which can be used for the brightening of cellulose fibres.

Products having very similar effects are obtained if, with otherwise the same procedure, the 11.0 g. of morpholine are replaced by 5.6 g. of monoethylamine, 5.7 g. of dimethylamine, 9.1 g. of diethylamine, 7.5 g. of monoethanolamine, 9.3 g. of 2-hydroxypropylamine, 9.3 g. of 2-methoxyethylamine, 9.3 g. of N-methyl-2-hydroxyethylamine, 13.0 g. of N,N-bis-(2-hydroxyethyl)-amine, 17.0 g. of N,N-bis-(2-hydroxypropyl)-amine, 13.0 g. of 2-(2-hydroxyethoxy)-ethylamine, 14.3 g. of 2,6-dimethylmorpholine or by 10.6 g. of piperidine.

If the 11.0 g. of morpholine are replaced by 6.0 g. of aniline, the pH is adjusted to 5 by the addition of 2 N hydrochloric acid and it is heated for 6 hours at 90–100° and neutralization is effected with sodium hydroxide solution, then the relatively difficultly water soluble disodium salt of 4-[3-phenyl-pyrazolyl-(1)]-4'-[4,6-bis-phenylamino-s-triazinyl-(2) - amino]-stilbene-2,2'-disulphonic acid is obtained.

This product too can be used, especially in combination with detergents, for the brightening of cellulose fibres.

EXAMPLE 5

If in Example 4, the 4.6 g. of aniline are replaced by 8.6 g. of 3- or 4-sulphophenylamine or their sodium salts, then with otherwise the same procedure, the tetrasodium salts of 4-[3-phenyl-pyrazolyl-(1)]-4'-[3- or 4-sulphophenylamino - 6 - morpholino - s - triazinyl-(2)-amino]-stilbene 2,2'-disulphonic acids are obtained. These products have relatively good water solubility and are principally suitable for the brightening of paper of cellulose textiles. Here too, the morpholine can be replaced by the amines given in Example 4.

In this way, equally effective brighteners for cellulose substrata are obtained.

These compounds can also be used from an acid bath to brighten polyamide materials.

Because of their good stability to acid, these products can also be used successfully in acid synthetic resin baths and alum-containing cellulose fibre suspensions in the manufacture of paper.

EXAMPLE 6

9.5 g. of 2,4-dichloro-6-methoxy-s-triazine (Am. Soc., 79, 2989 [1951]) are added to a solution of 27.1 g. of 4-amino-4'-[3 - phenyl - pyrazolyl - (1)]-stilbene-2,2'-disulphonic acid in the form of the sodium salt, which solution is produced according to Example 4 and the whole is stirred at pH 5–6 and at 20–30° until no more aromatic amine can be traced. The hydrochloric acid liberated is gradually neutralized with aqueous sodium carbonate solution.

4.6 g. of aniline are added to the mixture, the pH is kept at 7 with 15% sodium carbonate solution and the whole is heated for 6 hours at 90–95°. On adding sodium chloride, the disodium salt of 4-[3 - phenyl-pyrazolyl-(1)]-4'-[4 - methoxy - 6 - phenylamino-s-triazinyl-(2)-amino]-stilbene-2,2'-disulphonic acid formed is precipitated as a yellow precipitate. The new stilbene derivative is a yellowish, water soluble powder. The compound can be used for the brightening of cellulose and polyamide substrata. Products having a similar action are obtained when the 2,4-dichloro-6-methoxy-s-triazine is replaced by equivalent amounts of 2,4-dichloro-6-ethoxy-s-triazine or 2,4-dichloro-6-isopropyloxy-s-triazine.

EXAMPLE 7

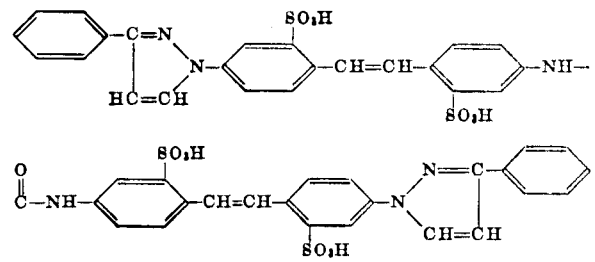

Phosgene is introduced at 0–10° into a solution of 10 g. of the sodium salt of 4-amino - 4' - [3-phenyl-pyrazolyl-(1)]-stilbene-2,2'-disulphonic acid in 300 ml. of water and the pH is kept at 6–7 by the gradual addition of 10% aqueous sodium carbonate solution until no more diazotizable amide can be traced. On adding sodium chloride and gently heating, the product of the above formula, in the form of the tetrasodium salt, is brought into a form which can easily be filtered off. It is filtered off under suction, washed with sodium chloride solution and dried. A yellowish water soluble powder is obtained which can be used for the brightening of cellulose fibres.

EXAMPLE 8

9.25 g. of cyanuric chloride are dissolved in 100 ml. of acetone at room temperature and, while stirring, poured into a mixture of 200 g. of ice and 50 ml. of water. An aqueous solution of the disodium salt of 25 g. of 4-amino-4'-[3-phenyl - pyrazolyl-(1)]-stilbene-2,2'-disulphonic acid produced as described in Example 4 is added dropwise while stirring to this cyanuric chloride suspension, care being taken by adding ice that the temperature remains below 0°. After the addition of the amine, the pH is adjusted to 3–4 with aqueous sodium carbonate solution and this pH is maintained until no more diazotizable amine can be traced. When this is the case, 4 g. of N-methyl-N-β-hydroxyethyl-amine are added, the temperature is gradually raised to 25° and the hydrochloric acid liberated is neutralized with 15% sodium carbonate solution. The mixture is then stirred at 20–30° and pH 7–8 until no more sodium carbonate is consumed. The resulting disodium salt of 4-[3-phenyl-pyrazolyl-(1)]-4'-[4-(N-methyl-N - β - hydroxyethyl-chloro-s-triazinyl-(2)-amino]-stilbene-2,2'-disulphonic acid is salted out by the addition of sodium chloride. After drying, the new optical brightener forms a yellowish, water soluble powder which can be used for the brightening of cellulose fibers, and especially of nylon or wool from an acid bath.

EXAMPLE 9

41.5 g. of 4-hydrazino-4'-nitrostilbene-2,2'-disulphonic acid, in the form of the disodium salt, are dissolved in 800 ml. of water and, at 65°, a solution of 4-chloro-phenyl-2-chlorovinyl ketone (B.P. 147–150°, 14 torr) in 50 ml. of ethylene glycol monomethyl ether are added to this solution while stirring. The mixture is stirred, first for 4 hours at 30° and then for 3 hours at 55–60°, and the hydrochloric acid liberated is gradually buffered with an aqueous solution of 5 g. of sodium carbonate. To complete the reaction, the mixture is stirred under reflux for 2 hours. It is then cooled. The precipitated product is then separated and purified by recrystallization from water/pyridine (volume ratio 9:1) with the addition of sodium hypochlorite.

In this way, the disodium salt of 4-[3-(4'-chlorophenyl) - pyrazolyl-(1)]-4'-nitro-stilbene-2,2'-disulphonic acid is obtained.

15 g. of cast iron powder are suspended in 600 ml. of water and, after the addition of 2 ml. of 80% acetic acid, the whole is heated for 30 minutes at 80–90°. 30.5 g. of the disodium salt of 4-[3-(4'-chloro-phenyl)-pyrazolyl-(1)]-4'-nitrostilbene-2,2'-disulphonic acid described above are added within 30 minutes to the suspension so prepared at 90–100° and the mixture is stirred under reflux until a sample which has been made alkaline has only a pale yellow color when dropped onto filter paper and the mixture does not become lighter on stirring any longer. The pH of the reduction mixture is then adjusted to 9–10 with aqueous sodium carbonate solution and the iron slurry is filtered off. In this way, a yellowish solution of the disodium salt of 4-amino-4'-[3-(4'-chloro-phenyl)-pyrazolyl-(1)]-stilbene-2,2'-disulphonic acid is obtained which has greenish blue fluorescence in UV light. Without being isolated, this product is converted into s-triazinyl derivatives by the procedure described in Examples 4 to 6 and the final products can be used as optical brighteners in the same manner as described in Example 4 and is used as starting material for the following Examples 10 to 34.

These optical brighteners fall under the formula

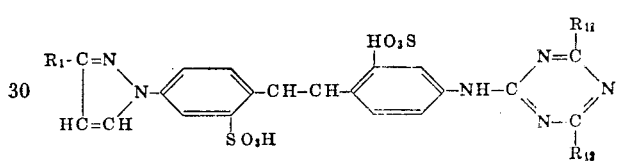

in which formula $R_1$, $R_{11}$ and $R_{12}$ represent the groups given in the respective columns of the following Table III. These derivatives are obtained by repeating Example 9 supra, and using as triazine starting material a 2-amino-s-triazine the substituents of which in 4- and 6-position correspond to those given under $R_{11}$ and $R_{12}$ in Table III. The optical brighteners of Examples 10 to 34 are obtained in the same manner but using in Example 9 a 2-chlorovinyl ketone substituted as indicated in the column headed $R_1$ of Table III. The procedure to be followed is given in the last column of that table.

TABLE III

| Example No. | $R_1$ | $R_{11}$ | $R_{12}$ | Procedure of Ex. |
|---|---|---|---|---|
| 10 | 4-chlorophenyl | Phenylamino | Morpholino | 4 |
| 11 | do | do | HO—CH₂CH₂—NH— | 4 |
| 12 | Phenyl | —NH—CH₂COOH | —N(CH₂CH₂OH)(CH₂CH₂OH) | 4 |
| 13 | do | —N(CH₃)(CH₂CH₂—SO₃H) | —OCH₃ | 6 |
| 14 | 4-methylphenyl | —NH—C₆H₄—COOH | —NH—CH₂—CH(OH)—CH₃ | 4 |
| 15 | Phenyl | —NH—C₆H₄(Cl) | —NH—C₆H₅ | 4 |
| 16 | 4-methoxyphenyl | —NH—C₆H₄(CH₃) | —NH—C₂H₅ | 4 |
| 17 | 3-chlorophenyl | —NH—C₆H₄(OCH₃) | —NH—CH₂CH₂OH | 4 |

TABLE III—Continued

| Example No. | $R_1$ | $R_{11}$ | $R_{12}$ | Procedure of Ex. |
|---|---|---|---|---|
| 18 | Phenyl | —NH—C₆H₄—SO₂NH₂ | —NH—CH₂CH₂—O(CH₂)₂OH | 4 |
| 19 | 4-bromophenyl | —NH—C₆H₃(SO₃H)(HO₃S)— | —NH—CH₂CH₂—CH₃ | 5 |
| 20 | 4-fluorophenyl | —N(morpholino) | —Cl | 8 |
| 21 | Phenyl | —N(CH₂CH₂OH)₂ | —NH₂ | 4 |
| 22 | do | —N(CH₃)₂ | —NH₂ | 4 |
| 23 | do | —NH₂ | —NH₂ | 4 |
| 24 | do | —NH—C₂H₅ | —N(C₂H₅)₂ | 4 |
| 25 |  (3,4-methylenedioxyphenyl) | —N(CH₂CH₂CH₂CH₃)(CH₂—CH(OH)—CH₂—OH) | —O—CH(CH₃)₂ | 6 |
| 26 | 3,4-dichlorophenyl | —N(C₂H₅)(CH₂—CH(OH)—CH₂OH) | —OC₂H₅ | 6 |
| 27 | 4-methylphenyl | —NH—CH₂—CH₂—O—CH₂—CH₂—OH (morpholino-type, HO—CH₂—CH₂) | —OCH₃ | 6 |
| 28 | 3-chlorophenyl | —NH—CH₂—CH(OH)—CH₃ | —NH—C₆H₅ | 4 |
| 29 | 2,4-dichlorophenyl | —NH—CH₂CH₂—OCH₃ | Same as above | 4 |
| 30 | Phenyl | —NH—(CH₂)₂—O—C₂H₅ | —Cl | 8 |
| 31 | do | —NH—(CH₂)₃—OCH₃ | —NH—C₆H₅ | 4 |
| 32 | do | —NH—C₆H₂(CH₃)₂—SO₃H | —N(CH₂CH₂OH)(C₆H₁₁) | 5 |
| 33 | 2,4-dimethylphenyl | —NH—C₆H₃(SO₃H)(CH₃) | —N(CH₂—CH(OH)—CH₃)(CH₂—C₆H₅) | 5 |
| 34 | Phenyl | —N(CH₂CH₂OH)₂ | —SC₂H₅ | 6 |

EXAMPLE 35

10 g. of a pale yellowish staple fibre fabric made of nylon (E. I. du Pont de Nemours, Wilmington, Del., U.S.A.) are treated for 30 minutes at 75° in a bath (liquor ratio 1:30) which contains 0.01 g. of the optical brightener described in Example 1 and 1.2 ml. of formic acid. The fabric is then rinsed and dried. The nylon fabric so treated appears considerably whiter in daylight than an untreated comparative sample.

EXAMPLE 36

White cotton poplin is treated for 15 minutes at 60–70° in an aqueous bath (liquor ratio 1:30) which contains 0.033 g. of the pyrazole derivative obtained according to Example 1 and 2 g. of sodium sulphate per litre. After rinsing and drying, a brilliantly brightened fabric is obtained.

If the same operation is performed in the presence of 1 g. per litre treatment liquor of NaOCl, then chemically and optically bleached fabric is obtained.

EXAMPLE 37

10 g. of a polyterephthalic acid glycol ester fabric, e.g. made of Dacron® (Du Pont de Nemours, Wilmington, Del., U.S.A.) having a yellowish appearance are dyed for 30 minutes at 95–100° in an aqueous bath (liquor ratio 1:50) which contains 0.01 g. of the pyrazole derivative described in Example 3 and 0.3 g. of a oleinalcohol pentadecyl glycol ether. The fabric is then rinsed and dried. The material so treated has a clearly more white appearance than an untreated comparative sample. So that the optical brightener is well dispersed in the treatment bath, the product is first dissolved in 5 ml. of ethylene glycol monomethyl ether.

EXAMPLE 38

10 g. of undyed acetyl cellulose yarn are dyed for 30 minutes at 75° in a bath (liquor ratio 1:30) which contains 0.2 g. of octadecyl alcohol pentadecaglycol ether and 0.08 g. of the optical brightener described in Example 3 in finely dispersed form. The yarn so treated, after rinsing and drying, has a considerably whiter appearance than before treatment.

EXAMPLE 39

100 parts of undyed nylon material are washed for 30 minutes at 70° in a washing liquor which contains 0.05 part of the pyrazole obtained according to Example 2 in a finely dispersed form and 8 g. of a synthetic detergent (liquor ratio 1:10). The material is then rinsed and dried. The fabric so treated has a more brilliant appearance than a fabric washed without the addition of brightener.

EXAMPLE 40

|   | Parts |
|---|---|
| Dodecyl sulphate | 9 |
| Dodecylbenzene sulphonate | 11 |
| Sodium tripolyphosphate | 11 |
| Tetrasodium pyrophosphate | 17 |
| Sodium sulphate | 37 |
| Brightener according to Example 1 | 0.2 | are worked up with 170 parts of water into a paste which is dried at 60° and then milled.

6 parts of this washing powder are dissolved in 1000 parts of water at 70–80° and sodium hypochlorite solution corresponding to 0.5 part of active chlorine is added. After waiting for 30 minutes, undyed cotton fabric is washed for 30 minutes at 80° in the washing liquor obtained (liquor ratio 1:30), then rinsed and dried. A very beautifully brightened fabric is obtained.

EXAMPLE 41

Cotton cretonne fabric is washed for 20 minutes at 60° in a washing liquor (liquor ratio 1:30) which contains per litre, 5 g. of a detergent of the following composition:

|   | Parts |
|---|---|
| Sodium pyrophosphate | 55 |
| Dodecylbenzene sulphonate | 30 |
| Sodium dichloroisocyanurate (chlorine content 30%) | 15 |
| Brightener mentioned in Example 1 | 0.33 |

After rinsing and drying, a fabric having a neutral white appearance is obtained.

We claim:
1. A compound having the formula

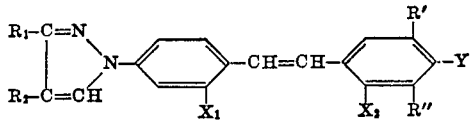

wherein
$R_1$ is thienyl or furyl;
$R_2$ is hydrogen or alkyl having 1 to 4 carbon atoms;
$X_1$ and $X_2$ represent independently hydrogen, —$SO_3H$, —CN, halogen, alkylsulfonyl having 1 to 4 carbon atoms, hydroxyalkylsulfonyl having 1 to 4 carbon atoms, carboxyalkylsulfonyl having 1 to 4 carbon atoms, sulfoxyalkylsulfonyl having 1 to 4 carbon atoms, alkoxy having 1 to 4 carbon atoms, the unsubstituted sulfon amide group, a sulfon amide group substituted by alkyl having 1 to 18 carbon atoms, hydroxyalkyl having 2 to 4 carbon atoms and aminoalkyl having 2 to 6 carbon atoms; a sulfomorpholide, sulfoperazide, sulfopiperidide or sulfopyrrolidide group, whereby the latter group can be substituted by alkyl having 1 to 4 carbon atoms and hydroxyalkyl having 1 to 4 carbon atoms;
Y represents the group

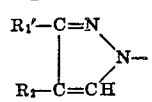

wherein
$R_2$ has the meaning given above;
$R_1'$ represents thienyl or furyl;
R' represents hydrogen, halogen, alkyl having 1 to 4 carbon atoms or alkoxy having 1–4 carbon atoms; and
R'' represents hydrogen or alkoxy having 1–4 carbon atoms.

2. A compound according to claim 1 which is

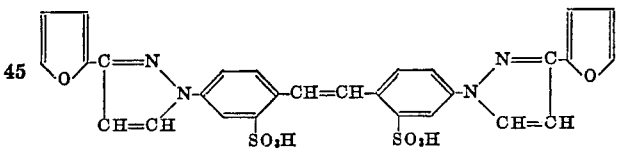

References Cited
UNITED STATES PATENTS 3,449,333   6/1969   Dorlars et al. ---- 260—240 CA
3,459,744   8/1969   Dorlars et al. ---- 260—240 CA JOHN D. RANDOLPH, Primary Examiner U.S. Cl. X.R.

106—176; 117—33.5 T; 162—162; 252—98, 117, 301.2 W, 543; 260—141, 240 B, 240 CA, 310, 556 B